United States Patent [19]

Akamine et al.

[11] Patent Number: 5,006,579

[45] Date of Patent: Apr. 9, 1991

[54] HALOGEN-CONTAINING RESIN COMPOSITION

[76] Inventors: Hiroshi Akamine, 2-7-17 Minamishinosaki; Yoshinori Sato, 2-7-18 Minamishinosaki, both of Kazo-shi, Saitama 347, Japan

[21] Appl. No.: 382,792

[22] Filed: Jun. 8, 1989

[51] Int. Cl.$^5$ ................................................ C08J 5/29
[52] U.S. Cl. ....................................... 524/238; 524/415
[58] Field of Search ................................. 524/238, 415

[56] References Cited

U.S. PATENT DOCUMENTS 4,425,280  1/1984  Ho .................................... 524/238

FOREIGN PATENT DOCUMENTS 0017445  2/1974  Japan ................................ 524/415

Primary Examiner—Joseph L. Schofer
Assistant Examiner—Peter D. Mulcahy

[57] ABSTRACT

This invention relates to a composition of a halogen-containing resin such as polyvinyl chloride in which the occurrence of a chalking phenomenon by light is prevented by including a specific copper salt.

7 Claims, No Drawings

HALOGEN-CONTAINING RESIN COMPOSITION

TECHNOLOGICAL FIELD

This invention relates to a halogen-containing resin composition. Particularly, it relates to a halogen-containing resin composition designed to prevent a chalking phenomenon in halogen-containing resin articles used outdoors.

TECHNOLOGICAL BACKGROUND

With the recent exploitation of the utility of halogen-containing resin articles, halogen-containing resin articles for outdoor use have increased. In particular, articles for long-term outdoor use, such as pipes, deck materials, roofing materials, and siding materials (clapboards made of halogenated resins), undergo influences of heat and ultraviolet ray ascribed to sunlight or influences of rainwater and oxygen in air, and decrease in mechanical strength and change in appearance. The change in appearance is exhibited as a chalking phenomenon in which a part exposed to sunlight becomes whitened. When this phenomenon occurs, colors such as brown, blue, red and green applied to the articles during molding discolor to a whitish tint, and with time, the entire surface of the articles is whitened, and their merchandise value is markedly impaired.

The following explanations have been made so far to account for the chalking phenomenon. One is that in the surface layer of the article, the halogen-containing resin undergoes decomposition by light, and consequently, the coloring agent used becomes easy to extract and flows away with rainwater. The other is that since higher fatty acids or their metal salts as components of a heat stabilizer, a lubricant, etc. added at the time of processing and also a filler have poor compatibility with the halogen-containing resin, they migrate to the surface of the article.

Various ultraviolet absorbers have been used as a weatherability improver for halogen-containing resins. Some of them are effective for improving the properties of the halogen-containing resins, for example, for retaining their mechanical strength, but none have proved to be entirely satisfactory for the prevention of the chalking phenomenon of the halogen-containing resins.

One of the inventors of the present application discloses in Japanese Patent Publication No. 8051/1985 a chalking-free halogenated resin composition comprising 100 parts by weight of a halogenated resin and 0.01 to 5 parts by weight of at least one of copper oxide, copper hydroxide, copper halides and inorganic acid salts of copper.

DISCLOSURE OF THE INVENTION

It is an object of this invention to provide a novel halogen-containing resin composition.

Another object of this invention is to provide a novel halogen-containing resin composition which contains a specific copper salt different from the copper salts used in the prior art and has improved resistance to chalking.

Further objects of this invention along with its advantages will become apparent from the following description.

According to this invention, these objects and advantages will firstly be achieved by a halogen-containing resin composition composed of an intimate mixture of (A) 100 parts by weight of a halogen-containing resin, and (B) 0.01 to 5 parts by weight of a copper salt of a mixture of glycine and a phosphoric acid.

The halogen-containing resin (A) in this invention may be, for example, a homopolymer or a copolymer obtained by the polymerization of a halogenated unsaturated compound such as a vinyl halide and a vinylidene halide, or a copolymer of such a halogenated unsaturated compound and a compound copolymerizable with it. Specific examples include vinyl chloride/ethylene copolymer, vinyl chloride/vinyl acetate copolymer, vinyl chloride/styrene copolymer, vinyl chloride/urethane copolymer and vinyl chloride methacrylate copolymer.

The halogen-containing resin (A) in this invention also includes resins obtained by halogenating polyolefin resins such as polyethylene and polypropylene, for example chlorinated polyolefin resins such as chlorinated polyethylene and chlorinated polypropylene.

It should be understood also that polymer blends of halogen-containing resins and halogen-free resins such as ABS, MBS, EVA, butadiene resin, urethane resin and vinyl acetate resin also come within the halogen-containing resin used in this invention.

The copper salt (B) used in this invention can be produced by adding copper oxide to an aqueous solution containing glycine and a phosphoric acid with stirring under heat to react these materials, or by adding a water-soluble copper salt to an aqueous solution containing a water-soluble glycine metal salt and a metal phosphate to react these material and forming a copper salt of glycine and the phosphoric acid as a precipitate.

Furthermore, it is possible to produce it by preparing an aqueous solution of a copper salt of glycine and a copper salt of phosphoric acid, and removing water from the aqueous solution.

In the production of the copper salt (B), it is desirable to use the copper compound in an amount of at least 1 equivalent as copper per mole of glycine and at least 2 equivalents as copper per mole of the phosphoric acid.

It is known that the reaction of glycine with copper oxide and the reaction of phosphoric acid with copper oxide independently proceed as follows.

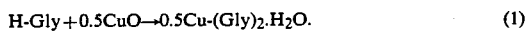  (1)

  (2)

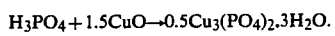

In the formulae, H-Gly represents glycine.

It is not clear however whether the copper salt (B) obtained by the above methods is a mere mixture of the products obtained by the above reactions. Since the combined use of a glycine copper salt and a phosphoric acid copper salt prepared separately has a low effect, it is believed that the copper salt (B) obtained by the above methods differs from a mere mixture of the glycine copper salt and the phosphoric acid copper salt.

The copper salt (B) used in this invention is preferably one in which 1 to 1.2 equivalents of copper exists per equivalent of the acid of the mixture of glycine and phosphoric acid. The mixing mole ratio of glycine to the phosphoric acid is preferably 1/0.1-2, more preferably 1/0.1-0.5.

Examples of the phosphoric acid are orthophosphoric acid, pyrophosphoric acid, metaphosphoric acid and tripolyphosphoric acid.

The halogen-containing resin composition of this invention contains 0.01 to 5 parts by weight of the copper salt (B) of the mixture of glycine and the phosphoric acid per 100 parts by weight of the halogen-containing resin (A). If the amount of the copper salt is below the specified lower limit, the effect of the copper salt is poor. If it exceeds the specified upper limit, no effect can be expected owing to the increase in amount, and it is economically wasteful. The preferred proportion of the copper salt is 0.1 to 3 parts by weight on the same basis.

The halogen-containing resin composition of this invention shows improved resistance to chalking by exposure to light. Investigations of the present inventors have shown that if instead of the copper salt (B), a copper-containing hydrotalcite or copper glycinate is used in combination with a metal salt of an organic acid, a composition showing a similar effect can be provided.

Accordingly, the present invention secondly provides a halogen-containing resin composition composed of an intimate mixture of (A) 100 parts by weight of a halogen-containing resin, (B') 0.01 to 5 parts by weight of at least one copper-containing compound selected from the group consisting of copper-containing hydrotalcites and copper glycinate, and (C) 0.01 to 5 parts by weight of a metal salt of an organic acid.

The halogen-containing resin (A) is the same as described hereinabove.

The copper-containing compound (B') is a copper-containing hydrotalcite and copper glycinate. At least one of them may be used.

The copper-containing hydrotalcites preferably have the composition of the following formula

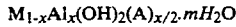

$$M_{1-x}Al_x(OH)_2(A)_{x/2} \cdot mH_2O$$

wherein
M is Cu or a combination of Cu and Mg,
A is 2 equivalents of an inorganic acid radical,
x is a number satisfying $0 < x \leq 0.5$, and m is a number of 0 to 5.

Compounds of this composition correspond to compounds called hydrotalcites in which Mg is partly or wholly replaced by Cu.

The copper-containing hydrotalcite may be produced in accordance with the following method by accurately adjusting the amounts of the starting substances to conform them to the composition of the desired compound.

For example, if the desired compound is $Mg_5CuAl_2(OH)_{16}.CO_3.4H_2O$, an acidic solution of 5 moles of $Mg(NO_3)_2.6H_2O$, 1 mole of $Cu(NO_3)_2.3H_2O$ and 2 moles of $Al(NO_3)_3.9H_2O$ in 10 liters of water and an alkaline solution of 1 mole of $Na_2CO_3.10H_2O$ and 16 moles of NaOH in 10 liters of water are added dropwise while adjusting the flow rates of both so that the pH is maintained at 9.0 to 11.0 at room temperature under atmospheric pressure. After the reaction, the reaction mixture was fully washed with water, dried at 80° C., and then finely pulverized. Chemical analysis leads to the determination that the resulting product approximately has the above composition.

Copper glycinate used in this invention has the composition $Cu(NH_2CH_2CO_2)_2.H_2O$, for example. The number of molecules of water of hydration is not limitative.

Copper glycinate used in the invention can be produced, for example, by adding a slightly excess of a dilute aqueous solution of potassium hydroxide to an aqueous solution of copper sulfate, and treating the resulting precipitate by a known method, for example by boiling it in an aqueous solution of glycine.

The copper-containing compound (B') is used in a proportion of 0.01 to 5 parts by weight per 100 parts by weight of the halogen-containing resin. If the proportion of the compound (B') is less than 0.01 part by weight, the effect of adding this compound is poor. If it exceeds 5 parts by weight, no increase in effect corresponding to the increased amount of the compound (B') can be expected, and it is economically wasteful.

The preferred proportion of the copper-containing compound (B') is 0.1 to 3 parts by weight per 100 parts by weight of the halogen-containing resin.

In this component, the organic acid metal salt (C) is used in combination with the copper-containing compound. The organic acid may preferably be, for example, an organic (thio)carboxylic acid or a phenol.

Examples of the organic (thio)carboxylic acid are saturated or unsaturated aliphatic mono- or dicarboxylic acids having 2 to 30 carbon atoms and may be substituted by a hydroxyl group or a mercapto group, and benzoic acid or phthalic acid which may be mono- or di-substituted by an alkyl group having 1 to 10 carbon atoms, a hydroxyl group or an amino group.

Examples of the aliphatic mono- or di-(thio)carboxylic acids include acetic acid, propionic acid, capric acid, 2-ethylhexoic acid, lauric acid, stearic acid, isostearic acid, 12-hydroxystearic acid, oleic acid, linolic acid, linoleic acid, thioglycollic acid, mercaptopropionic acid, laurylmercaptopropionic acid, aminoacetic acid, glutamic acid, oxalic acid, succinic acid, adipic acid, maleic acid and thiodipropionic acid.

Examples of the benzoic acid or phthalic acid include benzoic acid, p-t-butylbenzoic acid, dimethylbenzoic acid, aminobenzoic acid, salicyclic acid and phthalic acid.

Examples of the phenols are preferably mono- or di-hydroxybenzenes which may be substituted by an alkyl group having 1 to 15 carbon atoms. Specific examples of the phenols are phenol, nonylphenol, t-butylphenol, octylphenol, isoamylphenol, cresol and xylenol.

The metal forming the organic acid metal salt may preferably be, for example, an alkali metal or an alkaline earth metal.

The organic acid metal salt (C) is used in a proportion of 0.01 to 5 parts, preferably 0.1 to 3 parts, by weight per 100 parts by weight of the halogenated resin.

The halogen-containing resin composition of this invention may contain at least one additive customarily used for halogen-containing resins.

Examples of the additive are metal oxides, metal hydroxides, basic inorganic acid salts, hydrotalcite compounds, organic phosphite compounds, metal salts of organophosphoric acids, polyols, polyol esters, nitrogen-containing nonmetallic compounds, antioxidants, ultraviolet ray stabilizers, beta-diketone compounds, epoxy compounds, and organotin-type stabilizers.

As required, the composition of this invention may further comprise a plasticizer, a filler, a pigment, a reinforcing agent, a processing aid, a lubricant, a fire retardant, a blowing agent, an antistatic agent, etc.

EXAMPLES

The invention will now be described in detail by examples. Prior to it, synthesis examples of the copper salts used in Examples 1 to 4 will be described.

SYNTHESIS EXAMPLE 1

Example of synthesizing a copper salt of a mixed acid of 1 mole of glycine and 0.1 mole of phosphoric acid Water (500 g), 75 g (1 mole) of glycine and 13.1 g (0.1 mole) of 75% phosphoric acid were added to a 2-liter beaker equipped with a stirrer. The mixture was heated to 40° C. to dissolve the glycine. With continued stirring, 51.7 g (0.65 mole) of copper oxide CuO was added little by little. After the end of adding copper oxide, the mixture was reacted at 90° C. for 3 hours. The color of the reaction product changed from black to blue. The reaction product was dried under reduced pressure and then finely pulverized to give 132 g of the reaction product. It is designated as an evaluation sample A.

SYNTHESIS EXAMPLE 2

Example of synthesizing a copper salt of a mixed acid of 1 mole of glycine and 0.5 mole of phosphoric acid Water (500 g), 75 g (1 mole) of glycine and 65.3 g (0.5 mole) of 75 % phosphoric acid were added to a 2-liter beaker equipped with a stirrer to dissolve the glycine. With continued stirring, 87.6 g (1.1 moles) of copper oxide CuO was added little by little. After the end of adding copper oxide, the mixture was reacted at 90° C. for 3 hours. The color of the reaction product changed from black to blue. It was dried under reduced pressure and then finely pulverized to give 205 g of the reaction product. It is designated as an evaluation sample B.

SYNTHESIS EXAMPLE 3

Example of synthesizing a copper salt of a mixed acid of 1 mole of glycine and 0.3 mole of phosphoric acid Using the same apparatus as in Synthesis Example 1, 75 g (1 mole) of glycine and 114 g (0.3 mole) of trisodium phosphate 12-hydrate were dissolved under heat in 500 g of water. In a separate beaker, 237 g (0.95 mole) of copper sulfate pentahydrate and 40 g (1 mole) of sodium hydroxide were dissolved in 500 g of water. The resulting solution was poured into the aforesaid solution of glycine and trisodium phosphate, and the mixture was reacted at 90° C. for 3 hours. The resulting precipitate was separated by filtration, and dried to give 165 g of the reaction product. It is designated as an evaluation sample C.

SYNTHESIS EXAMPLE 4

Example of synthesizing a copper salt of a mixed acid of 1 mole of glycine and 0.5 mole of phosphoric acid (an example of synthesizing the copper salt by using pyrophosphoric acid; since pyrophosphoric acid results from dehydration of two molecules of water from orthophosphoric acid, its amount is ½ when calculated as phosphoric acid)

Using the same apparatus as in Synthesis Example 1, 75 g (1 mole) of glycine and 112 g (0.25 mole) of sodium pyrophosphate decahydrate were dissolved under heat in 500 g of water. In a separate beaker, 250 g (1 mole) of copper sulfate pentahydrate and 40 g (1 mole) of sodium hydroxide were dissolved in 500 g of water, and the resulting solution was poured into the above solution of glycine and sodium pyrophosphate. The mixture was reacted at 90° C. for 3 hours. The resulting precipitate was separated by filtration and dried to give 175 g of the reaction product. It is designated as an evaluation sample D.

SYNTHESIS EXAMPLE 5

Example of synthesizing a copper salt of a mixed acid of 1 mole of glycine and 2.5 moles of phosphoric acid Using the same apparatus as in Synthesis Example 1, 500 g of water, 15 g (0.2 mole) of glycine and 65.4 g (0.5 mole) of 75 % phosphoric acid were added to the beaker and heated to 40° C. to dissolve the glycine. With continued stirring, 67.7 g (0.85 mole) of copper oxide CuO was added, and the same operation as in Synthesis Example 1 was performed to give 125 g of the reaction product. It is designated as a comparison sample E.

The following examples further illustrate the present invention in detail.

EXAMPLES 1-4 AND COMPARATIVE EXAMPLES 1-4

A composition of the formulation shown below was pelletized by a pelletizer to form testing pellets. The pellets were extrusion-molded to prepare a test piece having a width of 60 mm, a thickness of 1 mm and a length of 30 cm. The resulting test piece was exposed outdoors.

After outdoor exposure for 6, 12, 18 and 24 months, the L, a and b values of the test piece were determined in accordance with the colorimetric standards of the Hunter system. The difference E from the $L_0$, $a_0$ and $b_0$ of an unexposed sample was calculated. The results are shown in Table 1. The colorimetery was performed by using a color meter (TC-3600 made by Tokyo Denshoku Co., Ltd.). As the E value is smaller, the degree of discoloration including the degree of whitening is less.

| Formulation | |
|---|---|
| Polyvinyl chloride (P = 1100) | 100 parts by weight |
| Calcium carbonate | 5 parts by weight |
| Red iron oxide pigment | 1.0 parts by weight |
| Polyethylene wax | 0.5 parts by weight |
| Zinc stearate | 0.6 parts by weight |
| Calcium stearate | 0.2 parts by weight |
| ST-210 (*1) | 0.5 parts by weight |
| Sample (type: Table 1) | (amount: Table 1) |

(*1): ST-210 is a tradename for a partial ester of dipentaerythritol made by Ajinomoto Co., Ltd.

For comparison, the above experiment was repeated except that copper phosphate above was added; or separately produced copper glycinate and copper phosphate were used together; or both of them were not added. The results are also shown in Table 1.

TABLE 1

| | | Sample | Mixing Amount (parts by weight) | Mole of phosphoric acid per mole of glycine | Results of outdoor exposure (degree of chalking $\Delta E$) | | | |
|---|---|---|---|---|---|---|---|---|
| | | | | | 6 months | 12 months | 18 months | 24 months |
| Example | 1 | A | 0.5 | 0.1 | 2.3 | 2.9 | 4.9 | 9.8 |
| | 2 | B | 0.5 | 0.5 | 1.7 | 2.8 | 4.1 | 8.3 |
| | 3 | C | 0.5 | 0.3 | 2.5 | 3.2 | 4.8 | 9.5 |
| | 4 | D | 0.5 | 0.25 | 2.4 | 3.1 | 5.1 | 9.6 |
| Comparative Example | 1 | Copper phosphate | 0.5 | — | 2.5 | 6.8 | 12.3 | 30.1 |
| | 2 | Copper glycinate Copper phosphate | 0.30 0.20 | — | 1.8 | 6.3 | 13.2 | 24.3 |
| | 3 | None | — | — | 7.0 | 15.6 | 32.1 | 30.5 |

EXAMPLES 5-11 AND COMPARATIVE EXAMPLES 5-7

| | |
|---|---|
| Polyvinyl chloride (P = 1100) | 100 parts by weight |
| Calcium carbonate | 10 parts by weight |
| Red iron oxide pigment | 1.0 parts by weight |
| Polyethyene wax | 0.5 parts by weight |
| ST-210 (*1) | 1.0 parts by weight |
| Hydrotalcite, copper glycinate (Table 1) | |
| Organic acid metal salt (see Table 2 for the type and amount) | |

(*1): Partial ester of dipentaerythritol made by Ajinomoto Co., Ltd.

From the above composition, testing sheets were prepared by a kneading roll at 185° C. The resulting sheets were stacked, and press-formed into a 2 mm-thick square test piece with one side measuring 20 cm, and the sample was subjected to outdoor exposure.

The evaluation of the test piece was conducted as in Example 1. The results are shown in Table 2.

The details of the copper-containing hydrotalcite compounds and copper glycinate used in the experiment are shown in Table 3.

TABLE 2

| | | Organic acid metal salt | | Hydrotalcite and copper glycinate | | Results of outdoor exposure Degree of chalking $\Delta E$ | | |
|---|---|---|---|---|---|---|---|---|
| | | Type | Amount | Type | Amount | After 6 months | After 12 months | After 18 months |
| Example | 5 | Zn stearate Ca stearate | 0.5 0.3 | $H_1$ | 0.5 | 1.5 | 3.3 | 5.8 |
| | 6 | Zn stearate Ca laurate | 0.5 0.3 | $H_2$ | 0.3 | 1.2 | 3.5 | 5.0 |
| | 7 | Zn stearate Ba-phenate | 0.5 0.3 | $H_3$ | 0.1 | 2.6 | 5.6 | 8.7 |
| | 8 | Zn stearate Ca stearate | 0.5 0.3 | $H_4$ | 0.5 | 1.8 | 4.3 | 5.9 |
| | 9 | Zn stearate Ca stearate | 0.5 0.3 | $H_1$ $H_4$ | 0.3 | 1.6 | 3.2 | 6.3 |
| | 10 | Pb stearate | 0.5 | $H_4$ | 0.5 | 3.8 | 8.4 | 10.6 |
| | 11 | Zn octylate | 0.5 | $H_1$ | 0.5 | 1.4 | 3.6 | 6.9 |
| Comparative Example | 5 | None | | None | | 13.8 | 25.9 | 32.0 |
| | 6 | None | | $H_1$ | 0.5 | 5.6 | 15.5 | 20.6 |
| | 7 | Zn stearate Ca stearate | 0.5 0.3 | None | | 15.0 | 28.2 | 32.5 |

TABLE 3

| Type | Composition | Compound |
|---|---|---|
| $H_1$ | $Mg_5CuAl_2(OH)_{16} \cdot CO_3 \cdot 4H_2O$ | Hydrotalcite |
| $H_2$ | $Mg_3Cu_3Al_2(OH)_{16} \cdot CO_3 \cdot 4H_2O$ | |
| $H_3$ | $Cu_6Al_2(OH)_{16} \cdot CO_3 \cdot 4H_2O$ | |
| $H_4$ | $Cu(NH_2CH_2CO_2)_2 \cdot H_2O$ | Copper glycinate |

We claim:

1. A halogen-containing resin composition composed of an intimate mixture of
   (A) 100 parts by weight of a halogen-containing resin, and
   (B) 0.01 to 5 parts by weight of a copper salt of a mixture of glycine and a phosphoric acid.

2. The composition of claim 1 in which in the copper salt of glycine and the phosphoric acid, copper is present in an amount of 1 to 1.2 equivalents per equivalent of the acid of the mixture of glycine and the phosphoric acid.

3. The composition of claim 1 in which the copper salt of the mixture of glycine and the phosphoric acid is a copper salt of a mixture of 1 mole of glycine and 0.1 to 2 moles of the phosphoric acid.

4. The composition of claim 1 in which the copper salt of the mixture of glycine and the phosphoric acid is produced by adding copper oxide or a water-soluble copper salt to the mixture of glycine and the phosphoric acid.

5. The composition of claim 1 in which the copper salt of the mixture of glycine and the phosphoric acid is produced by removing water from an aqueous solution of copper glycinate and a copper salt of the phosphoric acid.

6. The composition of claim 1 in which the copper salt is a divalent copper salt.

7. The composition of claim 1 in which the phosphoric acid is ortho-phosphoric acid, pyrophosphoric acid, metaphosphoric acid or tripolyphosphoric acid.

* * * * *